US009854176B2

(12) United States Patent
Sanders et al.

(10) Patent No.: US 9,854,176 B2
(45) Date of Patent: Dec. 26, 2017

(54) DYNAMIC LIGHTING CAPTURE AND RECONSTRUCTION

(71) Applicant: LUCASFILM ENTERTAINMENT COMPANY LTD., San Francisco, CA (US)

(72) Inventors: Michael Sanders, San Francisco, CA (US); Kiran Bhat, San Francisco, CA (US); Curt Isamu Miyashiro, Walnut Creek, CA (US); Jason Snell, Nicasio, CA (US); Stephane Grabli, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 745 days.

(21) Appl. No.: 14/164,006

(22) Filed: Jan. 24, 2014

(65) Prior Publication Data
US 2015/0215623 A1 Jul. 30, 2015

(51) Int. Cl.
*G06T 15/50* (2011.01)
*H04N 5/235* (2006.01)
(Continued)

(52) U.S. Cl.
CPC ......... *H04N 5/2351* (2013.01); *G06K 9/4661* (2013.01); *G06T 15/50* (2013.01);
(Continued)

(58) Field of Classification Search
None
See application file for complete search history.

(56) References Cited

U.S. PATENT DOCUMENTS 6,476,805 B1 * 11/2002 Shum ..................... G06T 7/97
345/420
2004/0001059 A1 * 1/2004 Pfister ................... G06T 9/001
345/419
(Continued)

OTHER PUBLICATIONS

Yee, Hector, "A Perceptual Metric for Production Testing (Submitted and Accepted in Journal of Graphics Tools, 2004)", http://pdiff.sourceforge.net/metric.html, accessed Dec. 20, 2013.
(Continued)

*Primary Examiner* — Dave Czekaj
*Assistant Examiner* — Tyler W Sullivan
(74) *Attorney, Agent, or Firm* — Kilpatrick Townsend & Stockton LLP

(57) ABSTRACT

Systems and techniques for dynamically capturing and reconstructing lighting are provided. The systems and techniques may be based on a stream of images capturing the lighting within an environment as a scene is shot. Reconstructed lighting data may be used to illuminate a character in a computer-generated environment as the scene is shot. For example, a method may include receiving a stream of images representing lighting of a physical environment. The method may further include compressing the stream of images to reduce an amount of data used in reconstructing the lighting of the physical environment and may further include outputting the compressed stream of images for reconstructing the lighting of the physical environment using the compressed stream, the reconstructed lighting being used to render a computer-generated environment.

23 Claims, 8 Drawing Sheets

(51) Int. Cl.
*G06K 9/46* (2006.01)
*H04N 19/63* (2014.01)
*H04N 19/61* (2014.01)

(52) U.S. Cl.
CPC ........... *H04N 5/2353* (2013.01); *H04N 19/61* (2014.11); *H04N 19/63* (2014.11)

(56) References Cited

U.S. PATENT DOCUMENTS

| | | | |
|---|---|---|---|
| 2005/0041024 A1* | 2/2005 | Green | G06T 15/06 345/426 |
| 2006/0132486 A1* | 6/2006 | Kim | G06T 15/506 345/420 |
| 2007/0236485 A1* | 10/2007 | Trepte | G06T 15/60 345/207 |
| 2009/0129690 A1* | 5/2009 | Marcellin | H04N 19/647 382/243 |
| 2010/0091018 A1* | 4/2010 | Tatarchuk | G06T 13/20 345/423 |
| 2011/0012901 A1* | 1/2011 | Kaplanyan | G06T 15/506 345/426 |
| 2014/0029849 A1* | 1/2014 | Sen | G06T 15/503 382/167 |
| 2014/0125668 A1* | 5/2014 | Steed | G06T 15/50 345/426 |
| 2014/0375659 A1* | 12/2014 | McGuire | G09G 5/363 345/520 |
| 2015/0117791 A1* | 4/2015 | Mertens | H04N 19/176 382/239 |

OTHER PUBLICATIONS

Tai, Yu-Wing et al., "Super Resolution using Edge Prior and Single Image Detail Synthesis," Korean Advanced Institute of Science and Technology, 6 pages.

Yin, Pei et al., "Tree-based Classifiers for Bilayers Video Segmentation," School of Interactive Computing, Georgia Institute of Technology, Atlanta, GA, 2007, 8 pages.

Annen, Thomas et al., "Spherical Harmonic Gradients for Mid-Range Illumination," Eurographics Symposium on Rendering, 2004, 7 pages.

* cited by examiner

DYNAMIC LIGHTING CAPTURE AND RECONSTRUCTION

FIELD OF THE ART

The present disclosure relates generally to dynamic lighting capture and reconstruction, and more specifically to capturing and reconstructing dynamic lighting for motion content relating to visual media, including films, television programs, gaming, or other visual media.

BACKGROUND

Traditionally, lighting reconstruction systems capture a still image of a physical environment and reconstruct lighting for a computer-generated environment using the still image. Due to the use of a still image, changes to the lighting of the physical environment over time (e.g., changes in lighting caused by an explosion) cannot be dynamically reflected in the computer-generated environment. Current systems employ a computer graphics artist to manually apply the changes in the computer-generated environment. Accordingly, it is very difficult to reflect the dynamic lighting changes in the physical environment using a still image without major expense and time. Furthermore, dynamic lighting capture and reconstruction cannot be currently achieved in real-time using a static image.

Embodiments of the invention address these and other problems both individually and collectively.

SUMMARY

The systems and techniques described herein allow dynamic lighting capture and reconstruction based on a real-time stream of images that capture the physically changing effects of an environment in which a scene is shot, such as light flicker, fire, explosion, or the like. The lighting information in the real-time stream of images may be used to illuminate a character in a computer-generated environment (e.g., a creature or other computer-generated character) as the scene is being shot. As a result, the dynamically changing lighting of the environment may be reflected in the computer-generated environment in near real-time or real-time. Post-capture editing by a computer graphics artist may be reduced or even eliminated using the dynamic lighting and reconstruction systems and techniques described herein.

Large amounts of data may be involved due to the use of streams of images in the dynamic lighting capture and reconstruction system and techniques described herein. For example, multiple cameras may stream live video of the physical environment of a scene, which may be processed to reconstruct the environment lighting. Large amounts of processing power and bandwidth may be required in order to perform the lighting capture and reconstruction, as well as the rendering, using the stream of images. Accordingly, in order to reduce the amount of data used in the techniques and systems disclosed herein, a system may receive the live video stream and may compress the amount of data that is transmitted for use in reconstruction of the lighting and/or rendering of the computer-generated environment. In one example, the system may only transmit frames or images that include data that is sufficiently different from data of previously received frames (e.g., a prior frame). For example, the system may compare data within a frame to data within a previously received frame, and may only transmit the frame if the data within the frame has changed by an amount above a threshold level. In some embodiments, the threshold level may be dynamically adjusted based on feedback from a post-render feedback engine.

As another example of reducing an amount of data used in lighting reconstruction or rendering, the system may generate one or more light maps as the video stream is received, and may then compress the one or more light maps to produce one or more compressed light maps. Generation of the compressed light maps may be performed in a manner that minimizes the amount of data that must be sent and processed by, for example, a lighting reconstruction engine and/or a rendering engine (e.g., a gaming engine). The compressed light maps may be streamed to the lighting reconstruction engine, which can dynamically reconstruct the lighting conditions of the physical environment in real or near-real time for rendering in a computer-generated environment. The rendering engine may receive lighting information from the reconstruction engine and can render the computer-generated environment accordingly. Furthermore, lighting in the computer-generated environment may be automatically modified in real or near real-time as the lighting conditions in the physical environment change over time.

According to at least one example, a computer-implemented method may be provided that includes receiving a stream of one or more images, the one or more images representing lighting of a physical environment. The method may further include compressing the stream of the one or more images to reduce an amount of data used in reconstructing the lighting of the physical environment. The method may further include outputting the compressed stream of the one or more images for reconstructing the lighting of the physical environment using the compressed stream, the reconstructed lighting being used to render a computer-generated environment. In some embodiments, the method may further include reconstructing the lighting of the physical environment using the compressed stream and outputting the reconstructed lighting of the physical environment for rendering a computer-generated environment.

In some embodiments, a computer-implemented method may be provided that includes receiving a stream of one or more images, the one or more images representing lighting of a physical environment. The method may further include generating one or more light maps based on the one or more images and compressing the one or more light maps to produce one or more compressed light maps, the one or more compressed light maps including an indication of a change in lighting in the one or more images compared to a previously received image. The method may further include outputting the one or more compressed light maps for reconstructing the lighting of the physical environment.

In some embodiments, a computer-implemented method may be provided that includes receiving a stream of images, the images representing lighting of a physical environment. The method may further include detecting a change in lighting over time in the stream of images and changing the lighting of a computer-generated environment over time based on the detected change in lighting in the stream of images.

In some embodiments, a system may be provided that includes a memory storing a plurality of instructions and one or more processors. The one or more processors may be configurable to receive a stream of one or more images, the one or more images representing lighting of a physical environment. The one or more processors may be further configurable to compress the stream of the one or more images to reduce an amount of data used in reconstructing the lighting of the physical environment. The one or more processors may be further configurable to output the compressed stream of the one or more images for reconstructing the lighting of the physical environment using the compressed stream, the reconstructed lighting being used to render a computer-generated environment. In some embodiments, the one or more processors may be further configurable to reconstruct the lighting of the physical environment using the compressed stream and output the reconstructed lighting of the physical environment for rendering a computer-generated environment.

In some embodiments, a system may be provided that includes a memory storing a plurality of instructions and one or more processors. The one or more processors may be configurable to receive a stream of one or more images, the one or more images representing lighting of a physical environment. The one or more processors may be further configurable to generate one or more light maps based on the one or more images and compress the one or more light maps to produce one or more compressed light maps, the one or more compressed light maps including an indication of a change in lighting in the one or more images compared to a previously received image. The one or more processors may be further configurable to output the one or more compressed light maps for reconstructing the lighting of the physical environment.

In some embodiments, a system may be provided that includes a memory storing a plurality of instructions and one or more processors. The one or more processors may be configurable to receive a stream of images, the images representing lighting of a physical environment. The one or more processors may be further configurable to detect a change in lighting over time in the stream of images and to change the lighting of a computer-generated environment over time based on the detected change in lighting in the stream of images.

In some embodiments, a computer-readable memory storing a plurality of instructions executable by one or more processors may be provided, wherein the plurality of instructions may include instructions that cause the one or more processors to receive a stream of one or more images, the one or more images representing lighting of a physical environment. The plurality of instructions may further include instructions that cause the one or more processors to compress the stream of the one or more images to reduce an amount of data used in reconstructing the lighting of the physical environment. The plurality of instructions may further include instructions that cause the one or more processors to output the compressed stream of the one or more images for reconstructing the lighting of the physical environment using the compressed stream, the reconstructed lighting being used to render a computer-generated environment. In some embodiments, the plurality of instructions may further include instructions that cause the one or more processors to reconstruct the lighting of the physical environment using the compressed stream and to output the reconstructed lighting of the physical environment for rendering a computer-generated environment.

In some embodiments, a computer-readable memory storing a plurality of instructions executable by one or more processors may be provided, wherein the plurality of instructions may include instructions that cause the one or more processors to receive a stream of one or more images, the one or more images representing lighting of a physical environment. The plurality of instructions may further include instructions that cause the one or more processors to generate one or more light maps based on the one or more images and to compress the one or more light maps to produce one or more compressed light maps, the one or more compressed light maps including an indication of a change in lighting in the one or more images compared to a previously received image. The plurality of instructions may further include instructions that cause the one or more processors to output the one or more compressed light maps for reconstructing the lighting of the physical environment.

In some embodiments, a computer-readable memory storing a plurality of instructions executable by one or more processors may be provided, wherein the plurality of instructions may include instructions that cause the one or more processors to receive a stream of images, the images representing lighting of a physical environment. The plurality of instructions may further include instructions that cause the one or more processors to detect a change in lighting over time in the stream of images and to change the lighting of a computer-generated environment over time based on the detected change in lighting in the stream of images.

The foregoing, together with other features and embodiments, will be described in more detail below in the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
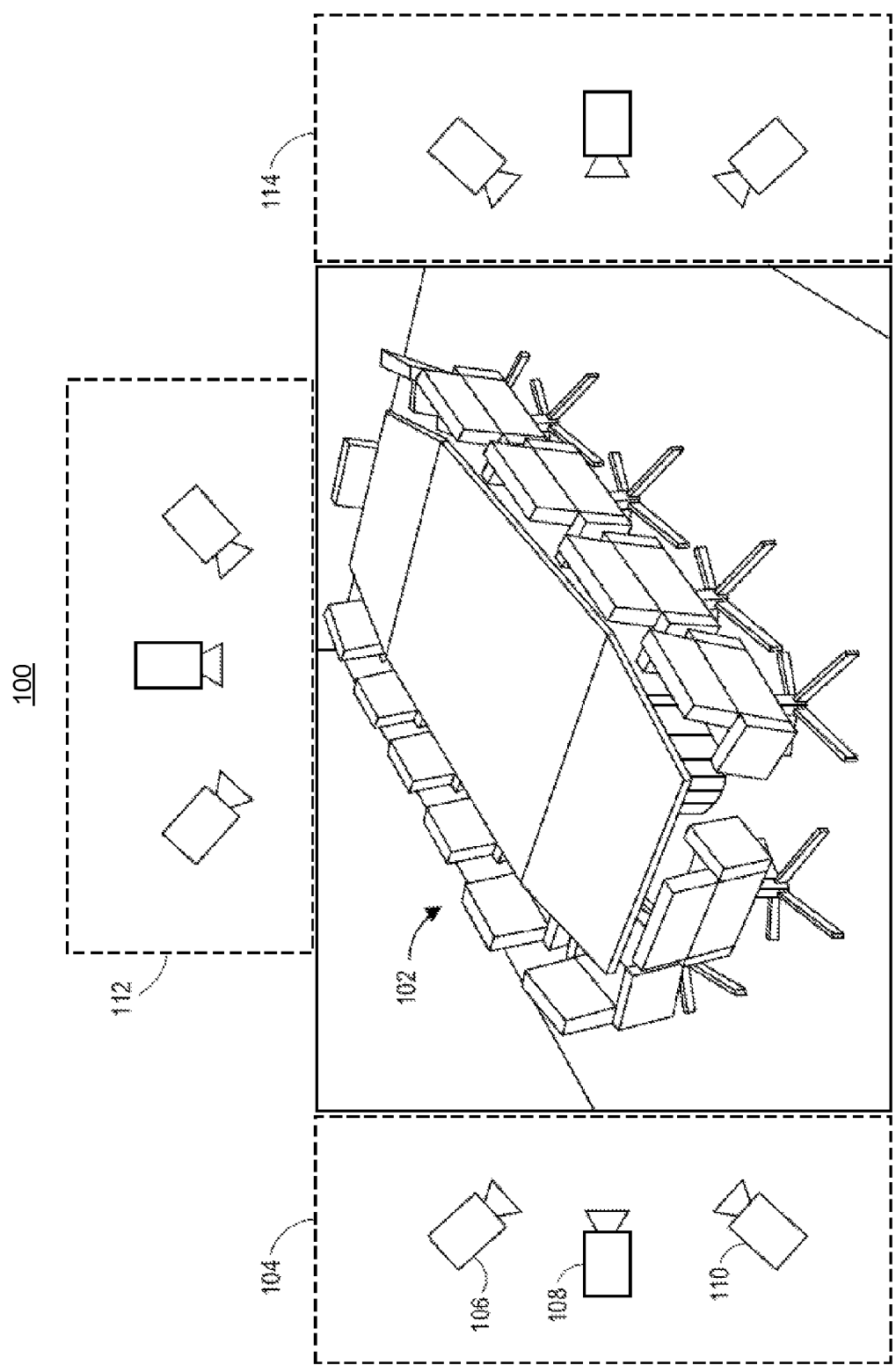
FIG. 1 illustrates an example of a system for dynamic lighting capture in a physical environment in accordance with an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Modern visual media productions oftentimes include a rendered scene with computer-generated objects, such as a character, building, or the like. For example, films, television programs, gaming, or other visual media may display a real physical environment along with a graphically rendered computer-generated object. In some embodiments, an entire scene may be made up of computer-generated objects that represent the physical environment or a modified version thereof. In order for a computer-generated object to be realistically depicted in the physical environment or to accurately represent the physical environment, it is desirable for the object to be illuminated as if it were naturally in or part of the environment when the scene was shot. For example, the computer-generated object should refract, focus, and emit light just as real objects would. Such realistic effects may include casting shadows, appearing in reflections, or the like. To achieve realistic illumination of a computer-generated object, the lighting at the point where the object will be located needs to be known in order to accurately depict the object in the environment.

A still image of a physical environment that contains illumination parameters at particular points in the physical environment may be used to reconstruct lighting for a computer-generated environment corresponding to the physical environment. For example, a rendering engine may use the still image to generate illumination information that may be used to illuminate different scenes in the computer-generated environment. Using a still image, however, does not allow for changes in the lighting of the physical environment, such as lighting changes due to an explosion or other dynamic lighting event, to be dynamically reflected in real-time in the computer-generated environment. For example, lighting reconstruction using still images requires a computer graphics artist to apply illumination changes in the computer-generated environment during post-processing. Use of an artist, however, adds extra expense and time to an already complex process of lighting capture and reconstruction.

The dynamic lighting capture and reconstruction systems and techniques of the present disclosure allow for changes in lighting of a physical environment to be dynamically captured using a live stream of images. The dynamically captured stream of images may be used to dynamically reconstruct the lighting in near real-time or real-time. The reconstructed lighting information may be used to illuminate different virtual objects rendered in a computer-generated environment that represents the physical environment. For example, the lighting information in the stream of images may be used to determine an illumination of a character in the computer-generated environment in near real-time or real-time as the scene is being shot.

Various techniques may be used to capture the lighting within the physical environment in a manner that allows the lighting to be reconstructed for use in a computer-generated rendering of the physical environment. In some embodiments, images of differing dynamic ranges may be used to capture the lighting at different points within the environment, and these images may then be used by a reconstruction engine to reconstruct the lighting of the environment. A dynamic range includes the ratio between the maximum and minimum measurable light intensities at a given point.

One example of using different dynamic range images includes utilizing a group of low dynamic range (LDR) cameras with differing exposure values that may be directed at a particular portion or location of the physical environment. FIG. 1 illustrates an example of a system 100 for dynamic capture of lighting in a physical environment 102 using LDR cameras. The system 100 includes light probes 104, 112, and 114. Each of the light probes 104, 112, 114 includes LDR cameras that are used to capture a stream of images of the physical environment 102. For example, light probe 104 includes LDR cameras 106, 108, and 110, each with different exposure values. In some embodiments, each light probe may include a single LDR camera that can take multiple images at different exposure values in a short period of time. The cameras may include any suitable type of camera and/or sensor (e.g., a camera for capturing red, greed, and blue (RGB) data, an infrared (IR) sensor, a ultra-violet (UV) sensor, a wavelength sensor, and/or the like). The captured video may include lighting information, depth information (e.g., Z-depth data such as lasers or infrared), two-dimensional (2D) content, three-dimensional (3D) content, high frame rate video, low frame rate video, video of any resolution, or any combination thereof.

Each light probe 104, 112, 114 may be used for capturing the lighting of a different portion or spatial location within the environment 102, and each camera may be directed at the corresponding portion of the physical environment 102 from the same or a different perspective. By using multiple light probes, illumination values at various spatial locations within the environment may be obtained. Each of the LDR cameras may capture a LDR stream of images with differing dynamic ranges based on the exposure value of each camera. For example, the cameras may capture images with varying darkness based on the exposure values. In some cases, the images from the cameras are non-overlapping. In other cases, the images from the cameras may partially or completely overlap. In some embodiments, a reflective object (e.g., a chrome sphere, a silver sphere, chrome box, silver box, or the like) may be placed at a point at which the LDR cameras are directed in order to reflect the light within the environment. The cameras can then capture the light reflected by the reflective object. In some embodiments, the cameras may have panoramic capabilities that can be pointed at the environment in general (without a reflective object being placed in the environment) to capture the light within the environment. Using such a camera, a panoramic image may be obtained that captures the entire 360° about an axis (e.g., a vertical y-axis). The group of LDR images captured by each light probe 104, 112, 114 may then be combined together in order to generate a light map (e.g., a high dynamic range (HDR) image) that covers the entire range of light intensities captured by each of the LDR cameras.

Another example of using different dynamic range images for reconstructing environment lighting includes using a single HDR camera that captures a HDR image. For example, a HDR image may be taken of a reflective sphere at a desired location within the environment. In some embodiments, multiple HDR cameras may be used in order to maximize the sampling of the light. The lighting information in the HDR image may then be used as a light map to reconstruct the lighting at the location within the environment.

The lighting information in each of the light maps may then be used as a source for reconstructing the lighting in the portion of the environment at which the cameras are directed in order to illuminate different computer-generated objects in a rendered scene of the environment. The light maps allow the relationship of light between the computer-generated objects and their surroundings to be properly simulated. The light maps can be continuously generated as new images are received in order to dynamically update the lighting information in real-time or near real-time. By continuously updating the light maps, the lighting in the computer-generated environment may be automatically modified in real or near real-time as the lighting conditions in the physical environment change over time.

Figure 2:
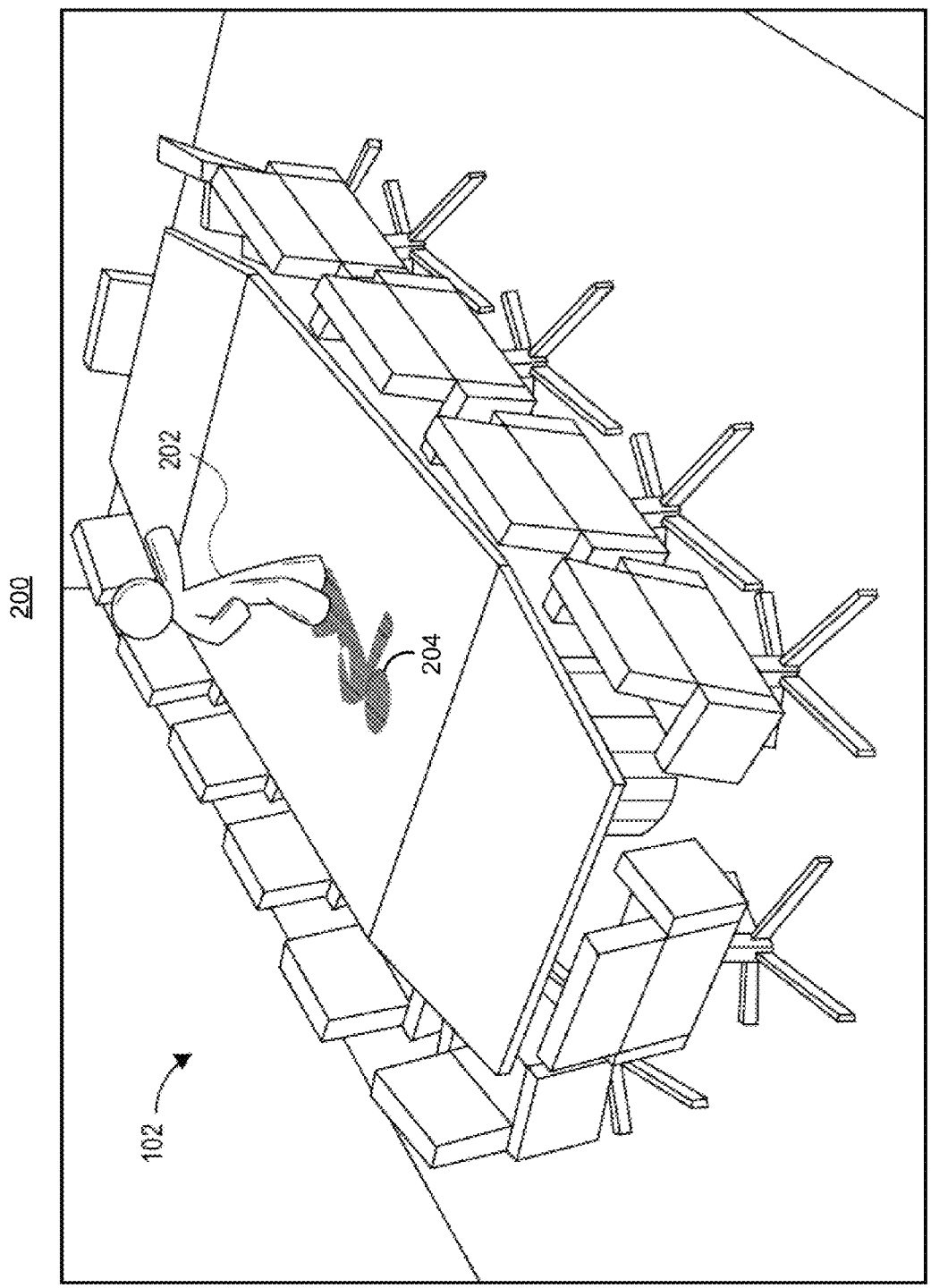
FIG. 2 illustrates an example of a computer-generated environment rendered using dynamically captured and reconstructed lighting in accordance with an embodiment of the present invention.

FIG. 2 illustrates an example of a computer-generated environment 200 rendered using dynamically captured and reconstructed lighting. The computer-generated environment 200 includes the physical environment 102 displayed along with a computer-generated character 202. The character 202 can be illuminated using the lighting information in the one or more light maps in order to realistically display the character 202 as if the character 202 were originally present in the physical environment 102. For example, the light maps may be used to illuminate the character 202 so that a shadow 204 is properly projected from the character 202.

Figure 8:
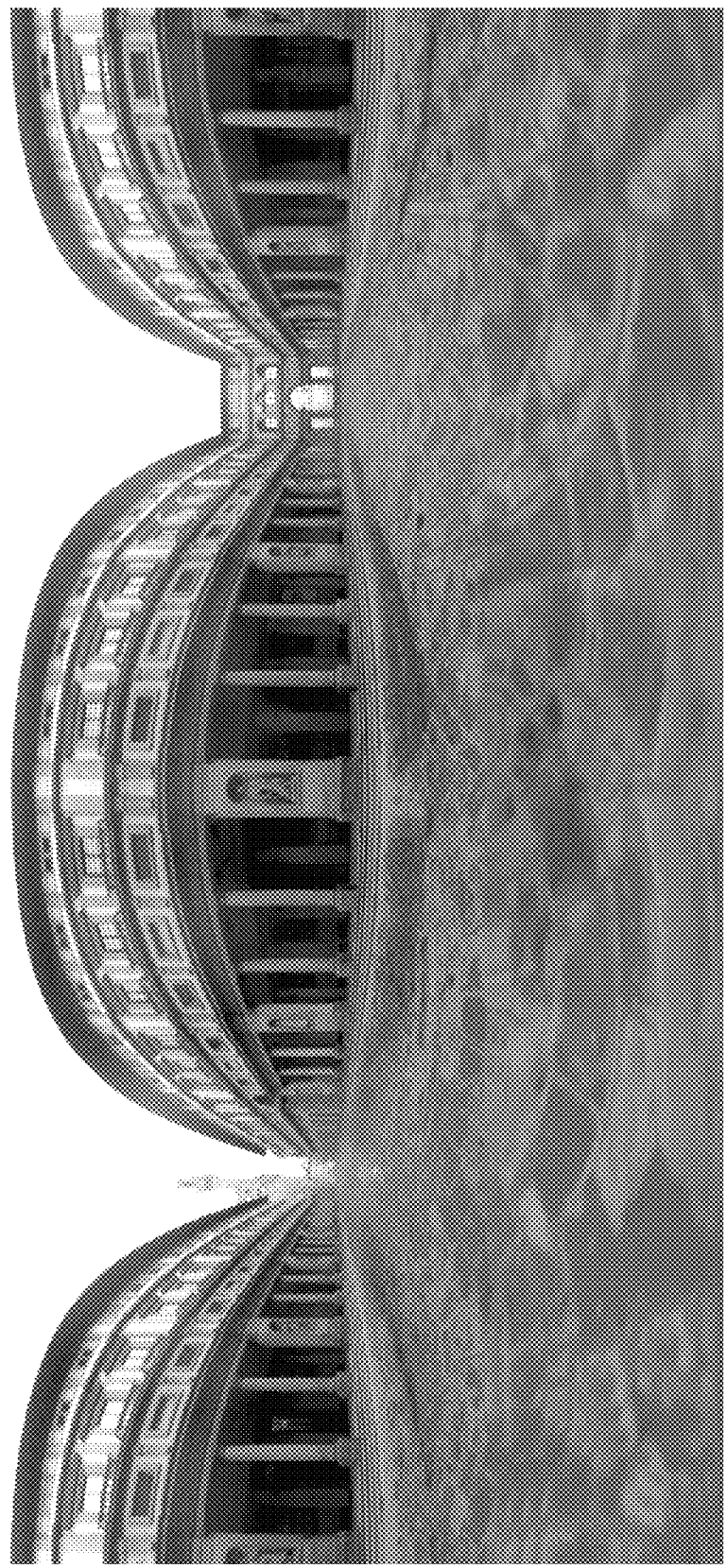
FIG. 8 shows an example of an equirectangular image.

In some embodiments, a reconstruction program or system and/or a rendering program or system may only process images that are in an equirectangular map format. FIG. 8 illustrates an example of an image 800 in an equirectangular format. Accordingly, the light maps may be converted into an equirectangular format prior to being used for lighting reconstruction and/or rendering. For example, the light map image may be converted so that it has a field of view (FOV) in an x-direction of 180° and a FOV in a y-direction of 360°, and so that it has a 2:1 aspect ratio. In some embodiments, if a spherical image is obtained by capturing images of a spherical reflective object in the physical environment, the spherical image may be converted to an equirectangular map by unfolding the image in order to be used in lighting reconstruction and/or rendering.

Figure 3:
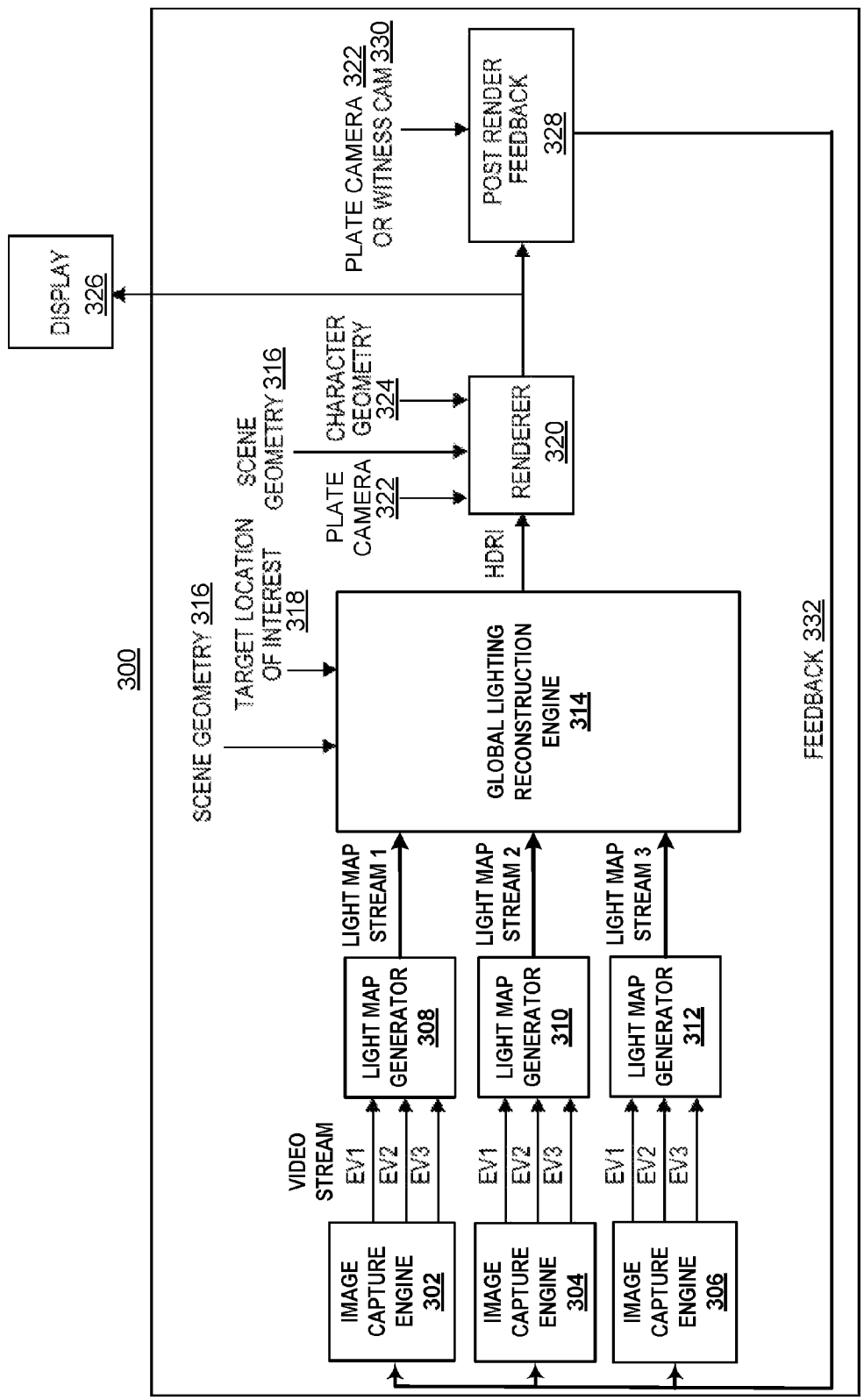
FIG. 3 illustrates an example of a dynamic lighting capture and reconstruction system in accordance with one embodiment of the present invention.

FIG. 3 is an example of a block diagram illustrating components of a dynamic lighting capture and reconstruction system 300. The system 300 includes three image capture engines 302, 304, and 306 that may be used to capture a continuous stream of images using the techniques described above. One of ordinary skill in the art will understand that any number of capture engines may be used in accordance with the particular requirements of a project. The image capture engines 302, 304, 306 may include any of the capture systems or techniques described above. For example, image capture engines 302, 304, 306 may include a light probe with a single or multiple LDR cameras, a light probe with a single or multiple HDR cameras, and/or the like.

Figure 4:
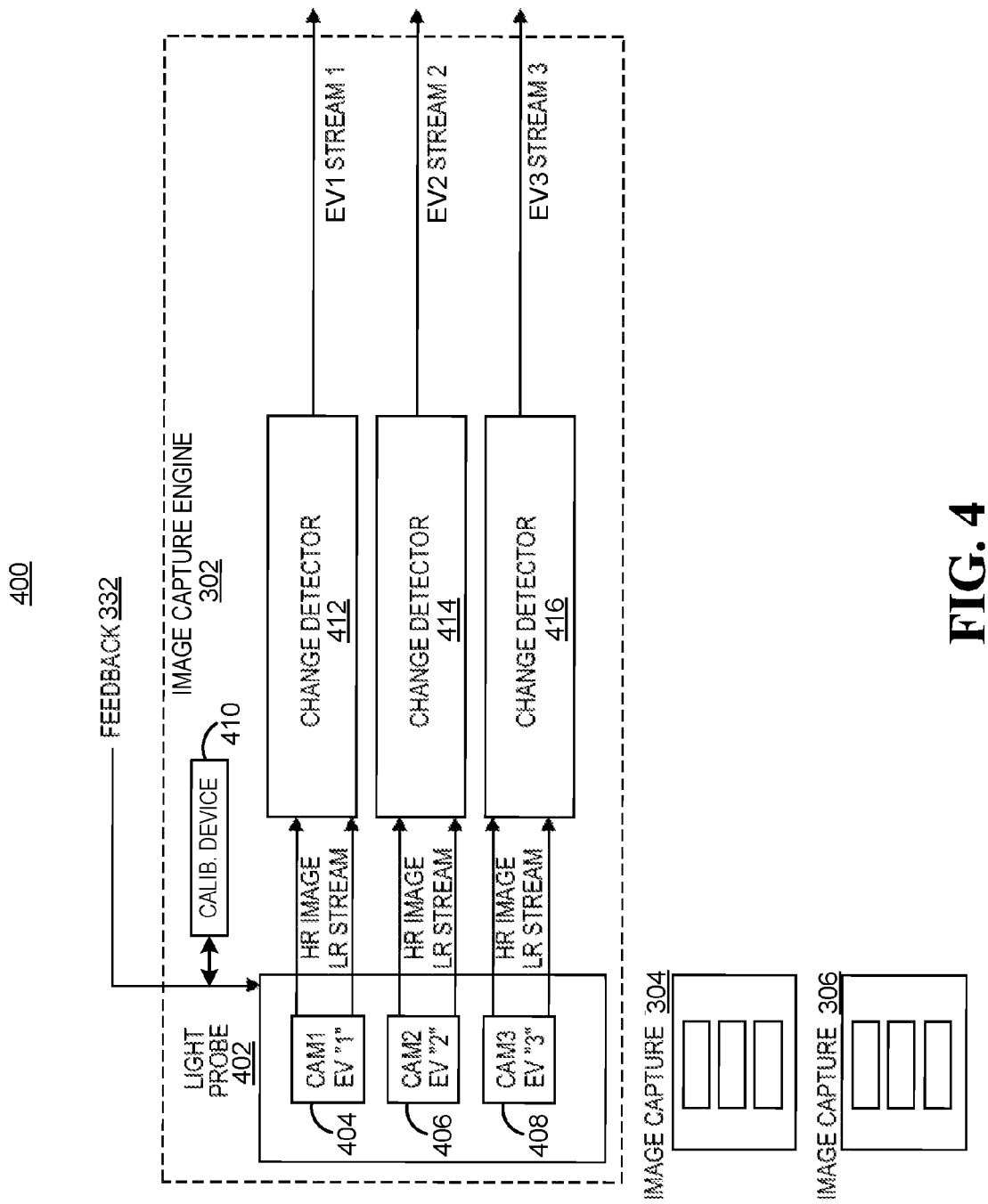
FIG. 4 illustrates an example of a dynamic lighting capture system in accordance with one embodiment of the present invention.

An example of an image capture engine 302 is illustrated in FIG. 4. FIG. 4 is an example of a block diagram illustrating components of a dynamic lighting capture system 400 that includes image capture engines 302, 304, and 306. Each of the image capture engines 302, 304, 306 may be positioned to capture the lighting at different portions or spatial locations within a physical environment. Details of image capture engines 304 and 306, while not shown, may include similar components as those of image capture engine 302.

Image capture engine 302 includes a light probe 402. In some embodiments, the light probe 402 may include any of the light probes 104, 112, or 114 illustrated in FIG. 1. The light probe 402 includes LDR cameras 404, 406, and 408. Each of the LDR cameras 404, 406, 408 are configured with different exposure values so that each camera captures a different dynamic range of lighting intensities. Each LDR camera 404, 406, 408 may be directed at the same location within the physical environment, with each camera pointing toward the location from a different or the same perspective. Accordingly, each of the LDR cameras 404, 406, 408 may capture a stream of LDR images of the location with differing dynamic ranges based on the exposure value of each camera. In some embodiments, a reflective object, such as a chrome sphere, may be placed at a position at which the LDR cameras 404, 406, 408 are directed so that the cameras can capture the light reflected by the reflective object. In some embodiments, the cameras 404, 404, 406 may be panoramic so that they can capture the lighting of the environment without using a reflective object.

In some embodiments, the cameras 404, 406, 408 may continuously output a stream of low resolution images while periodically or less frequently outputting a single high resolution image. For example, the stream of low resolution images may be continuously output at 30 frames per second (fps) and the high resolution image may be output at 1 fps. One of ordinary skill in the art will understand that any appropriate frame rate may be used to output low and/or high resolution images and that a high resolution image may be output at different or varying periods. By transmitting low resolution images the majority of the time, the amount of data that is streamed from the cameras 404, 406, 408 to the remaining components of the system is minimized due to the low resolution images having less pixels than the higher resolution images. Periodically outputting the high resolution image allows higher quality data to be periodically used in the lighting reconstruction and rendering processes. For example, high resolution images may be used as a guide when reconstructing high resolution light maps (e.g., HDR images). In some cases, the continuously output low resolution images may be used to reconstruct or estimate one or more high resolution images, and the periodically output high resolution images may be used to increase the accuracy of the estimation. In such cases, edge detection may be performed on the periodically output high resolution images and the continuously output low resolution images may be used to fill the regions between the edges. As a result, image magnification may be improved by the knowledge of high quality edges. An example of high resolution image generation is described in Tai et al., "Super Resolution using Edge Prior and Single Image Detail Synthesis," which is incorporated herein by reference.

In some embodiments, only low resolution images are output by the cameras 404, 406, 408 so that the amount of data streamed to the system is minimized even further. In some embodiments, only high resolution images are output in the event that the system components can handle the larger amount of data. For example, the compression techniques described below may allow the system to handle a continuous output of high resolution images.

The continuous stream of images output by the cameras 404, 406, 408 leads to large amounts of data being transmitted and processed throughout the system, which may require expensive processing tools and/or lead to processing delays. Various techniques may be used to reduce the amount of data that is ultimately used in reconstructing the lighting of the physical environment and/or rendering a computer-generated environment. For example, systems and techniques may include compressing the amount of lighting data received by the light probe 402 prior to outputting the lighting data for use in reconstruction and/or rendering.

In one example of reducing the amount of data that is received, one or more of the image capture engines 302, 304, 306 may only output images with data that is sufficiently different from data of previously received images. For example, each of the image capture engines 302, 304, 306 may include change detectors 412, 414, 416. The change detectors 412, 414, 416 may compare data within each received image to data within a previously received image in order to determine whether the data within the images has changed. The change detectors 412, 414, 416 may only transmit the image if the data within the image has changed by an amount above a threshold level. The change detectors 412, 414, 416 may use various techniques to compare data of two images. For example, the change detectors 412, 414, 416 may compare two images using a technique that models the human visual system by utilizing a perceptual metric. Using such a model, the change detectors 412, 414, 416 may determine that the two images are perceptually identical even if the images include imperceptible numerical differences (e.g., slight differences in corresponding pixels). An example of a human visual perception model is described in Yee, "A Perceptual Metric for Production Testing," which is incorporated herein by reference. As another example, the change detectors 412, 414, 416 may conduct a pixel-by-pixel comparison in order to determine sufficient changes in the images. For example, corresponding pixels in each image may be compared to one another in order to determine if a sufficient change has occurred in the pixel values. One of ordinary skill in the art will understand that other suitable techniques may be used to detect a change in lighting between images within the stream of images.

In some embodiments, the change between the currently received image and the prior image(s) may be compared to a threshold level in order to determine whether the change is sufficient enough to output the image for further processing. For example, the threshold level may be set so that the currently received image is not output if the change compared to the prior image(s) is only an imperceptible difference. Imperceptible differences may occur, for example, if corresponding pixels are misaligned, small intensity changes occur, or the like. In some cases, intensity changes (e.g., pixel intensity units or values, or the like) between corresponding pixels in a currently and previously received image, or a sum or average of all pixels in the images, may be compared to a threshold intensity change in order to determine whether the difference in intensity between the images is to be considered an imperceptible difference. For example, it may be determined that there is an imperceptible difference if the sum or average of intensity changes between images is below a threshold (e.g., if the average change is below 1 bit, 2 bits, 3 bits, or the like).

In some embodiments, the threshold level may be dynamically adjusted based on feedback from a post-render feedback engine 328. For example, if the post-render feedback engine 328 determines that a rendered output image has not changed from a previously rendered image, the threshold may be adjusted upward so that more significant changes must be detected in any subsequently received images in order to output the image. Specific details relating to the post-render feedback engine will be described in further detail below.

In the event the change detectors 412, 414, and/or 416 detect a change in an image that exceeds the threshold level, an image may be output for processing by the light map generators 308, 310, 312. For example, at a particular point in time, change detectors 412 and 414 may determine that images received from each of cameras 404 and 406, respectively, include a sufficient change in pixel values from previously received images from each of the camera 404 and 406. At the particular point in time, change detector 416 may determine that an image received from camera 408 does not include a significant change from a previously received image. As a result, for the particular point in time, only the images from cameras 404 and 406 are output to light map generators 308 and 310.

In some embodiments, the change detectors 412, 414, and/or 416 may detect that only a portion of a particular image has changed as compared to a previous image. The change detectors 412, 414, 416 may then output only the portion of the image that has changed. In such embodiments, the downstream components of system 300 (e.g., the light map generators, global lighting reconstruction, and/or renderer) will be configured to receive and process partial images.

In some embodiments, the change detectors 412, 414, and/or 416 may further limit the amount of images that are output by differentiating actual lighting changes from occlusion of one or more of the cameras 404, 406, 408 by a moving subject. For example, a current image may include different lighting data than a previous image due to a person standing between the camera and the point at which light is being captured (e.g., a reflective object, or the like). A change detector may determine that a detected change in lighting data within the current image is due to the person blocking the camera while the lighting is being captured rather than due to an actual lighting change. The change detector may conduct the differentiation by implementing a classifier built using a machine learning algorithm. For instance, a linear classifier may be used. The linear classifier may be trained by providing examples of correct segmentations of images into foreground and background layers. The segmentations may be made manually or automatically. By separating the foreground from the background, the change detector may determine that an occlusion is affecting the lighting as opposed to an actual lighting change. An example of automatic segmentation using a tree-based classifier is described in Yin et al., "Tree-Based Classifiers for Bilayer Video Segmentation," which is incorporated herein by reference. If a change is determined to be caused by an occlusion, the change detectors 412, 414, 416 may decline to send one or more images even in view of a change that exceeds the threshold level. As a result, only meaningful illumination changes may be output from the image capture engines 302, 304, 306.

The change detectors 412, 414, and 416 may continuously monitor the stream of images output from cameras 404, 406, 408, and thus may continuously drop images or portions of images that do not include significant differences in data compared to a previous image. Accordingly, the change detectors 412, 414, 416 operate to transmit only changes in the dynamic ranges captured by each of the cameras 404, 406, 408. As a result, the streams output from the change detectors 412, 414, 416 include a minimized amount of data that must be processed by light map generators 308, 310, 312, resulting in less processing delays and power consumption by the systems 300.

Another example of reducing the amount of data sent by one or more of the image capture engines 302, 304, 306 includes compressing the video stream by performing a basis compression on the data before it is output by the cameras 404, 406, 408. For example, a moving picture experts group compression may be performed on the video data before it is output from the cameras 404, 406, 408. The compressed video stream may be processed by the system and decompressed prior to being rendered by the renderer 320.

The light map generators 308, 310, 312 of system 300 may receive the streams output from the image capture engines 302, 304, 306. One of ordinary skill in the art will understand that any number of light map generators may be used in accordance with the particular requirements of a project. In some embodiments, light map generators 308, 310, 312 may receive the output streams from the change detectors within each image capture engine 302, 304, 306. In other embodiments, one or more of the image capture engines 302, 304, 306 may not include any change detectors, in which case the light map generators 308, 310, 312 may receive the streams directly from the light probes within each image capture engine 302, 304, 306.

Using the captured streams of images, the light map generators 308, 310, 312 may generate one or more light maps that represent the lighting of the physical environment. Each of the light map generators 308, 310, 312 may generate a light map for a specific spatial location within the environment according to the perspective of the corresponding image capture engine 302, 304, or 306. The one or more light maps include a greater dynamic range of luminosity than the LDR images captured by the image capture engines 302, 304, 306. One or more of the light maps may include a HDR image. The light maps may include actual light intensity values (e.g., radiance, irradiance, or the like) that identify a measure of light at given points within the image, and may be used to reconstruct the lighting of the physical environment.

The light map generators 308, 310, 312 may receive the LDR image streams at the different exposure values output by each image capture engine 302, 304, 306 and may combine them in order to generate a light map that covers the entire range of light intensities captured by each of the LDR cameras. As a result, the light maps include a greater dynamic range of luminosity than each of the individual LDR images. For example, corresponding images from the three streams EV1 Stream 1, EV2 Stream 2, and EV3 Stream 3 output from image capture engine 302 may be combined to generate a light map that covers the entire dynamic range of light intensities captured by each of the images. In some embodiments, a light map may be generated from a set of images with the different exposure values by linearizing the images using an inverse of the different camera response functions and then averaging the images into a single light map image. A weighted average may be used to account for the reliability of the pixel measurements within the images. In some embodiments, a light map corresponding to each image capture engine 302, 304, 306 may be generated or updated each time new images are received.

In some embodiments, the light map generators 308, 310, 312 may store one or more of the images as the images are received. The stored images may be used to generate a light map. For example, at a particular point in time, change detector 412 may determine that a sufficient change in lighting data has not occurred between a currently received image and a previously received image. Change detectors 414 and 416 may determine that a sufficient change has occurred between a current and previously received image from cameras 406 and 408 at the point in time, respectively. As a result, only the images from cameras 406 and 408 are output to the corresponding light map generator 308. For that point in time, the light map generator 308 may generate or update a light map using a most recently stored image for camera 404 along with the currently received images from cameras 406 and 408. In some embodiments, the light map generators 308, 310, 312 may delete an image after a certain period of time or after a certain number of images has been received subsequent to that image. In some embodiments, the light map generators 308, 310, 312 may only update portions of a light map corresponding to images that are output by the corresponding change detectors. For example, if change detector 412 determines that a sufficient change in lighting is not present in an image from camera 404, the light map generator 308 may not update that portion of the light map at that point in time. In such embodiments, the light map generators 308, 310, 312 may only update the light maps or portions of light maps when new images are received from corresponding change detectors.

In some embodiments, the image capture engine 302 may include a single HDR camera that is used to capture a light map. Such embodiments may eliminate the need for a light map generator to generate light maps by combining various images from differently exposed LDR cameras. In such embodiments, the image capture engine 302 may include a single change detector that can filter the HDR images that are output to the global lighting reconstruction engine 314 based on detected changes using, for example, similar techniques as those described above with respect to change detectors 412, 414, 416.

The global lighting reconstruction engine 314 of system 300 may reconstruct the lighting of the physical environment to illuminate a portion of a computer-generated environment using, in part, the lighting information from the various light maps. For example, the global lighting reconstruction engine 314 may generate a global light map, such as a HDR image, or a stream of global light maps that can include global lighting information for one or more locations within the physical environment. The global light map may be used by a rendering system or a program for representing true illumination values of the environment so that computer-generated objects can be realistically illuminated in the computer-generated environment.

The global lighting reconstruction engine 314 receives as input the stream of light maps from the light map generators 308, 310, 312, a scene geometry 316, and a target location of interest 318. In some embodiments, the scene geometry 316 may include a scan of the physical environment (e.g., a 2D or 3D scan) that includes the actual geometry of the environment. The scan may be initially obtained using a geometry scanner before the light probes begin capturing the lighting within the environment. In other embodiments, if enough light probes are present in the physical environment so that a sufficient amount of the environment is captured, the scene geometry 316 of the physical environment (or an approximation thereof) may be reconstructed from the various HDR images, such as the light maps received from the light map generators 308, 310, 312 or directly from HDR cameras. Reconstruction of the scene geometry may be accomplished using various 3D vision-type techniques. For example, two or more cameras (e.g., image capture engines 302, 304, 306) may capture a 3D scene from different viewpoints. 3D vision techniques may be used to leverage epipolar geometry (e.g., geometry of stereo vision) to recover 3D coordinates for given points in the images as captured from the different viewpoints of the cameras. The 3D scene geometry of the physical environment may then be reconstructed from the various viewpoints of the cameras. In some embodiments, the physical environment may, for the most part, remain static during a shoot, in which case trackers (feature points) may be identified before the shoot and used as feature points in the scene geometry reconstruction. Identifying trackers may greatly simplify the reconstruction.

The target location of interest 318 includes a specific location or position that needs to be illuminated in a virtual or computer-generated environment during a scene. For example, the target location of interest 318 may include a position of an actor or object that will be included in the computer-generated environment as, for instance, a computer-generated character or object. As one specific example, an actor that is playing a character may wear a location detection device indicating the target location of interest 318. For example, the actor may wear one or more visible markers that indicate the location or locations (e.g., arms, legs, head, etc.) of the actor. As another example, the actor may wear one or more wireless devices that indicate the location or locations of the actor.

Using the stream of light maps from the light map generators 308, 310, 312 and the scene geometry 316, the global lighting reconstruction engine 314 can reconstruct the lighting of the physical environment for a given point of a scene and can generate a global light map (e.g., an HDR image, referred to as HDRI in FIG. 3). By reconstructing the lighting of the physical environment, the global light map includes lighting information of the environment as if the lighting were captured using actual light probes. In some embodiments, the lighting of the entire physical environment may be reconstructed by interpolating illumination or lighting information for locations that are not covered by light probes. The interpolation may be done using the received light maps that cover only a portion of the physical environment. For example, the three light probes 404, 406, 408 that are at different spatial locations within the physical environment may capture illumination information at those spatial locations. Because the light probes 404, 406, 408 may not capture lighting of the entire physical environment, the system 300 may need to reconstruct the illumination or lighting at various locations (e.g., the target location of interest 318) that may not be within any of the spatial locations of the light probes 404, 406, 408. Virtual light maps may be determined for these various locations and may include illumination or lighting information as if actual light probes were used to capture the lighting at those locations. The reconstruction of the lighting to create virtual light maps for the various locations not covered by actual light maps may be based on lighting interpolation using the actual light maps. As one specific example, the scene geometry may be rendered as a panoramic render from a target position (e.g., target location of interest 318). In regions visible from at least one of the light probes 404, 406, 408, each pixel position of the panoramic render may be associated with a pixel position in the generated light maps. In some cases, a given pixel may be visible by more than one of the light probes 404, 406, 408. In such cases, light intensity values (e.g., radiance, irradiance, or the like) of one or more corresponding pixels may match wherever there is overlap. In some embodiments, when light intensity values for corresponding pixels do not match, the values may be averaged. In regions of the physical environment where there is no data from a light probe, the existing lighting information from the light probes 404, 406, 408 may be extrapolated (e.g., using linear extrapolation, or the like) and used to interpolate the missing lighting data. For example, the extrapolated light intensity values from the light maps may be projected onto the scene geometry 316, and the projection may be used to reconstruct a global light map (virtual light map) from the perspective of various target locations of interest (e.g., the location of interest 318). The lighting interpolation may occur in real-time or near real-time as the stream of light maps is received.

The global lighting reconstruction engine 314 may generate a global light map for various target locations of interest by mapping the radiance values of the light maps to the scene geometry 316. For example, a global light map may be determined for the target location of interest 318 and may include illumination information for the target location 318 as if an actual light probe were used to capture the lighting at the target location of interest 318. As new images are received while a scene is shot, the global lighting reconstruction engine 314 may update or generate a new global light map based on newly received or updated light maps. Lighting for the target location of interest 318, which may vary over time as the scene is shot, may be updated using the updated or new global light maps. Accordingly, virtual light maps may be generated so that the lighting information may be updated as if a light probe were following the subject (e.g., actor, object, animal, etc.) around the physical environment.

The system 300 further includes a renderer 320 (or rendering engine). The renderer 320 may include any type of computer graphics renderer, such as a gaming engine, that may render a scene using any appropriate type of rendering technique, such as raycast, raytrace, hidden line, powercast, powertrace, and/or the like. In general, the renderer 320 may generate a rendering (e.g., an image or group of images) from one or more models or scene files. The models or scene files may include various descriptions of a virtual or computer-generated scene, including geometry, viewpoint, texture, lighting, and shading information. In some embodiments, the renderer includes a graphics processing unit that may be used to aid in the rendering of the computer-generated environment.

The renderer 320 may receive as input the global light map from the global lighting reconstruction engine 314, the scene geometry 316, video data from a plate camera 322, and character geometry 324. As described above, the scene geometry 316 may include a scan of the physical environment (e.g., a 2D or 3D scan) that includes the actual geometry of the environment, or may include a reconstructed environment based on the light maps (e.g., HDR images). A plate camera 322 includes the camera that is actually shooting the scene. For example, the plate camera 322 may capture a background plate and an actor that is playing a character that will be added as a computer-generated character to the physical environment. A background plate is a scene including the physical environment before any virtual or computer-generated characters are added. In some embodiments, the entire background and all objects and characters may be computer-generated, in which case no background plate is used. The character geometry 324 may include a mesh representation of the character or other object that is to be added as a computer-generated character or object. The mesh representation may include a 3D geometry made up of points and normals. At a particular point in time, a global light map is used by the renderer 320 to render the scene captured by the plate camera 322 with global illumination from the same point of view as the plate camera 322. The results are then added to the background plate using, for example, a differential rendering technique.

Accordingly, the renderer 320 can use the various inputs to render the computer-generated environment (e.g., the computer-generated environment 200) with appropriate lighting based on the illumination or lighting information from the global light map. For example, a scene may be recreated as if the scene were originally shot with a computer-generated character or object present in the scene in the first place. The renderer 320 uses the global light map to realistically illuminate the computer-generated character or object in the scene so that the character or object refracts, focuses, and emits light just as real objects would. The lighting in the computer-generated environment may be automatically modified in real or near real-time as the lighting conditions in the physical environment change over time and the light maps are updated. After rendering the virtual or computer-generated scene, the renderer 320 may output the scene to a display 326 for viewing by a user. In some embodiments, the rendered scene may be saved to a storage medium (e.g., a non-transitory memory, such as a hard drive, a disk, a flash drive, and/or the like) so that the rendered scene can be used in offline applications.

The light maps and global light maps include large amounts of data that must be used by the global lighting reconstruction engine 314 and the renderer 320, respectively. Another technique that may be used to reduce the amount of data that is used in reconstructing the lighting of the physical environment and/or rendering a computer-generated environment may include compressing the lighting data within the light maps prior to outputting the lighting data for use in reconstructing the lighting and/or rendering the computer-generated environment. For example, the light map generators 308, 310, 312 may compress the one or more light maps received from the image capture engines 302, 304, 306 to produce one or more compressed light maps. The one or more compressed light maps may include an indication of a change in lighting (e.g., one or more coefficients) in the one or more images as compared to a previously received image. Compared to the lighting or illumination data (e.g., the pixel data) that is included in the light maps, the compressed light maps include far less information.

Various techniques may be used to compress the light maps to produce the compressed light maps. For example, the light map generators 308, 310, 312 may include a coder/decoder (codec) that can project a light map onto a basis, such as a spherical harmonic basis or a wavelet basis, so that the lighting information can be represented using various basis coefficients. The coefficients may correspond to various frequency modes of illumination within the light maps. The light map generators 308, 310, 312 may then only output the basis coefficients that include a change in lighting in a currently received image compared with a previously received image. Therefore, a small amount of coefficients that include less information than the corresponding lighting data are output to the global lighting reconstruction engine 314.

The light maps may include a signal representing the lighting information, and a wavelet or a spherical harmonics basis may be used to represent the signal. For example, the signal may be decomposed and represented as a group of coefficients mapped to the basis. The coefficients may indicate how to scale each of the bases in order to reconstruct the signal included in the light maps. As one example, the light maps may include a spherical signal (e.g., based on a reflective sphere being used to capture the image) that may be projected onto a spherical harmonics basis. A spherical harmonics basis includes frequency space basis functions that are defined over a unit sphere, which includes a set of points with a distance of one from a fixed central point. A spherical light distribution included in each light map may be projected onto a spherical harmonics basis and a group of coefficients may represent the lighting. As another example, the signal may be projected onto a wavelet basis and represented as a group of coefficients.

Instead of transmitting the actual pixel data that is included within the light maps, the light map generators 308, 310, 312 may output to the global lighting reconstruction engine 314 the basis coefficients (spherical, wavelet, or the like) representing the lighting data within a light map for an image that has changed from a previously received image. For example, the light map generators 308, 310, 312 may store previous image coefficients. The light map generators 308, 310, 312 may then compare new coefficients with the stored coefficients in order to identify coefficients that have changed. Based on the comparison, only the coefficients that have changed may be output to the global lighting reconstruction engine 314.

In some embodiments, the global lighting reconstruction engine 314 may include a codec that can decode the basis coefficients (spherical, wavelet, or the like) in order to reconstruct the light map including the signal with the lighting information. The global lighting reconstruction engine 314 can then reconstruct the lighting of the physical environment using the techniques described above and output a global light map to the renderer 320. In other embodiments, the global lighting reconstruction engine 314 may work directly with the basis coefficients in order to reconstruct the lighting of the physical environment without having to first decode the basis functions. The global lighting reconstruction engine 314 may conduct a linear interpolation on the coefficients based on the target location of interest 318 in order to obtain coefficients representing lighting information at the location of interest 318. The new basis coefficients, or reconstruction coefficients, may then be output to the renderer 320. For example, spherical harmonics coefficients representing the lighting information (reconstruction coefficients) may be interpolated by computing translational gradients of the basis coefficients at the same time the light maps are projected onto the spherical harmonics basis coefficients, and then performing a higher order interpolation (e.g., non-linear) on the coefficients based on the gradients. An example of generating spherical harmonics coefficients using interpolation techniques is described in Annen et al., "Spherical Harmonic Gradients for Mid-Range Illumination," which is incorporated herein by reference. As another example, the coefficients may be interpolated linearly by doing a weighted average of different points in the light map, where the weight is proportional to the distance from the target location of interest 318 to each light probe position.

The renderer 320 may render the computer-generated environment with appropriate lighting by working directly with the reconstruction coefficients. For example, the renderer 320 may include a set of coefficients representing an approximation of the bidirectional reflectance distribution function (BRDF) and/or additional inter-reflections for each point within the physical environment. The renderer may then perform a dot product (for diffuse objects) or a matrix-vector product (for glossy objects) using the set of coefficients and the reconstruction coefficients to obtain the final light intensity emitted from the surface at a given point within the physical environment.

By compressing the light maps to include coefficients representing the lighting information, the amount of data output to the reconstruction engine 314 and then to the renderer 320 may be drastically reduced. The reconstruction and rendering may then be conducted more efficiently and with the use of less system resources (e.g., memory, processing power, and/or the like).

In some embodiments, a post render feedback engine 328 may be used to provide feedback 332 to the image capture engines 302, 304, 306 in order to enhance the quality of the captured lighting information. For example, the plate camera 322 that is used to film a character in a physical environment may provide a live image of the physical environment as it is being filmed. For example, the physical environment may include the conference room physical environment 102 illustrated in FIG. 1. Further, the geometry of the conference room and the reconstructed illumination in the global light map can be used to re-render the conference room. The live image of the conference room and the re-rendered image of the conference room may then be compared by the post render feedback engine 328 to determine if a match occurs. In the event the post render feedback engine 328 determines that a sufficient match is not present, a feedback signal may be output to the image capture engines 302, 304, 306 directing a user or one or more of the image capture engines 302, 304, 306 to adjust one or more parameters or settings.

The feedback signal may indicate that one or more parameters or settings of light probes (e.g., light probe 402) needs to be adjusted in order to more appropriately capture the lighting of the physical environment. For example, during a calibration stage that includes placing the light probes in a correct position for lighting capture, the post render feedback engine 328 may determine that a portion of the physical environment is not captured by the image capture engines 302, 304, 306. The feedback engine 328 may send a feedback signal indicating that the light probes need to be moved to a different location and/or that a new light probe needs to be added to the physical environment. This type of feedback may be displayed on a monitor so that a user can physically move the light probes.

Other types of parameters may be adjusted based on feedback while a scene is being shot, during which physical movement of the light probes may not be permitted. For example, various parameters may be continuously adjusted as the scene is shot, such as exposure value, dynamic range, frame rate, resolution, and/or the like. For example, the post render feedback engine 328 may determine that a portion of the dynamic range is not well captured, and may send a feedback signal indicating that an exposure value of one or more of the cameras 404, 406, or 408 needs to be adjusted in order to more appropriately capture the desired dynamic range. In some embodiments, one or more of the light probes may receive the feedback signal and may automatically adjust the corresponding parameter or setting. In other embodiments, the feedback signal may be output on a display so that a user can manually adjust the parameter or setting of one or more of the light probes.

In some embodiments, as illustrated in FIG. 4, a calibration device 410 (feedback device) within each of the image capture engines 302, 304, 306 may be used along with the post render feedback engine 328 for calibrating the image capture engines 302, 304, 306. The calibration device 410 may include a witness camera (e.g., the witness cam 330), a chrome sphere, and a gray sphere. The witness camera may be used to film the physical environment along with the chrome and gray spheres at certain spatial locations within the environment. The chrome sphere operates to reflect the light (as described above) so that the light probes 404, 406, or 408 can measure the light of the physical environment. The gray sphere includes a certain percentage of gray (e.g., 18%) that may be used as a reference point for which rendered images may be compared. For example, a chrome and gray sphere may be placed at a location within the environment at which an actor may be performing a scene (e.g., attached to an actor, placed in the location prior to the actor performance, or the like). The witness camera may capture an image of the chrome and gray sphere. The calibration device 410 (e.g., a processor within the calibration device 410) may receive a rendered image of a computer-generated character played by the actor. The calibration device 410 (e.g., a processor) may then compare the rendered image against the captured image (of the spheres) in order to determine if the lighting used in the rendering illuminates the computer-generated character in the same way that the actual lighting affected the chrome and gray spheres. Using this feedback, the parameters or settings of the image feedback engines 302, 304, or 306 may be adjusted accordingly.

Using the above systems and techniques, the lighting of a physical environment may be accurately captured and used to reconstruct the lighting for use in rendering a realistically illuminated computer-generated environment. The compression systems and techniques allow for a reduced amount of data that needs to be processed reconstructing the lighting of the physical environment and/or for rendering a computer-generated environment. Various examples of processes will now be described implementing the techniques and systems described above.

Figure 5:
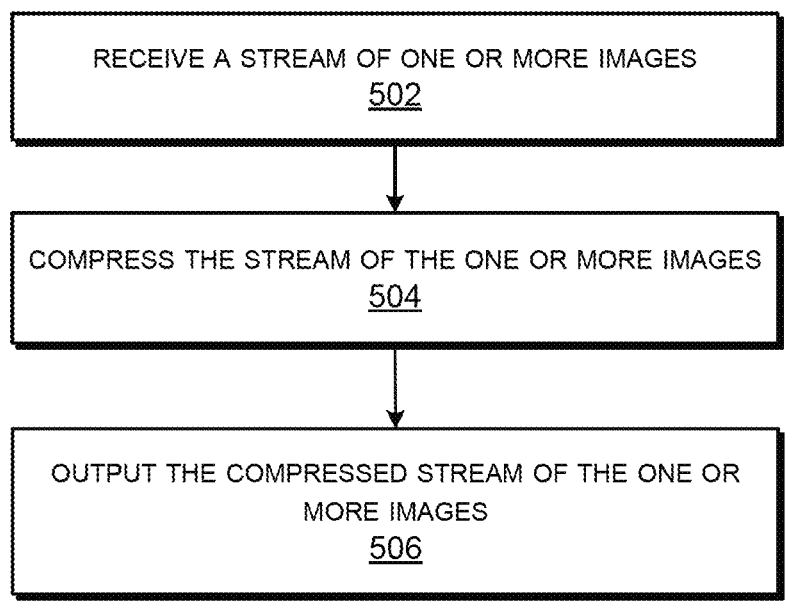
FIG. 5 illustrates an example of a process for dynamically capturing and reconstructing lighting in accordance with one embodiment of the present invention.

FIG. 5 illustrates an example of a process 500 for dynamically capturing and reconstructing lighting of a physical environment. Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Figure 7:
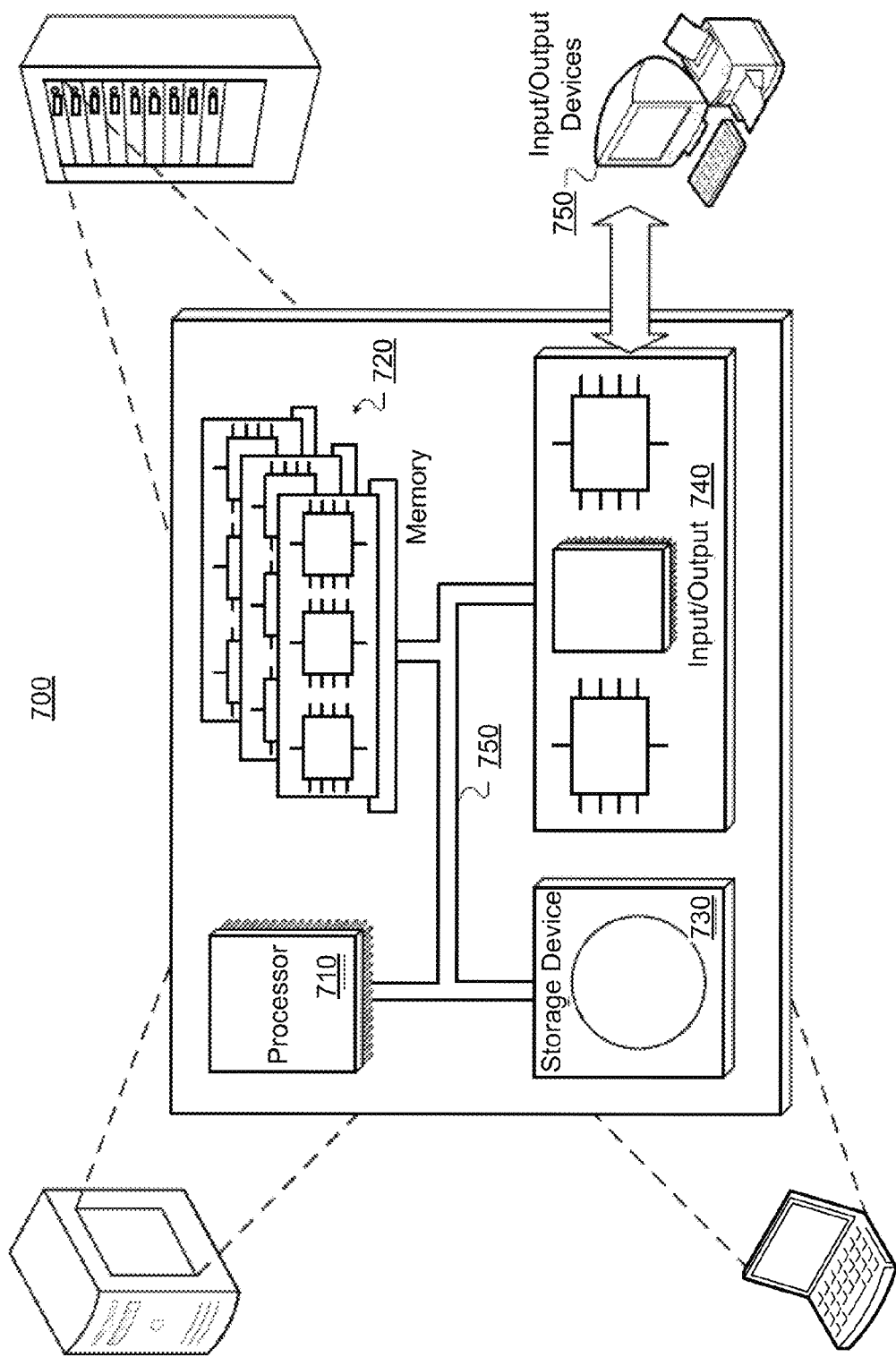
FIG. 7 shows an example of a computer system that may be used in various embodiments of the present invention.

In some aspects, the process 500 may be performed by a computing device, such as the computer system 700 shown in FIG. 7.

Process 500 may begin at block 502 by receiving a stream of one or more images. The one or more images represent lighting of a physical environment, such as physical environment 102 illustrated in FIG. 1. In some embodiments, the stream of images is received and captured by the image capture engines 302, 304, 306 and then received by the change detectors 412, 414, 416 and/or the light map generators 308, 310, 312 from the image capture engines 302, 304, 306. In some embodiments, the one or more images include low dynamic range images. For example, the one or more images may include a first low dynamic range image captured at a first exposure value, a second low dynamic range image captured at a second exposure value different than the first exposure value, and a third dynamic range image captured at a third exposure value different than the first and second exposure values.

At block 504, the stream of images are compressed in order to reduce an amount of data that is used in reconstructing the lighting of the physical environment. In some embodiments, the stream of images is compressed by the image capture engines 412, 414, 416. For example, the change detectors 412, 414, 416 may detect a change in an image of the one or more images compared to one or more previously received images. The change detectors 412, 414, 416 may determine whether the detected change is below a threshold level and may decline to use the image for reconstructing the lighting of the physical environment in response to determining that the detected change is below the threshold level. For example, the change detectors 412, 414, 416 may decline to output the image for use in reconstructing the lighting of the physical environment. Accordingly, the data within each received image may be compared to data within a previously received image in order to determine whether data within the images has changed. The change detectors 412, 414, 416 may only transmit or otherwise output the image if the data within the image has changed by an amount above a threshold level. The threshold level may be set to indicate whether the change is sufficient enough to output the image for further processing (e.g., only allow output if a human perceptual change has occurred). The change detectors 412, 414, 416 may use various techniques to compare data of two images, as described above with respect to FIG. 4. In some embodiments, the change detectors 412, 414, and/or 416 may detect that only a portion of a particular image has changed as compared to a previous image, and may output only the portion of the image that has changed.

In some embodiments, the stream of images is compressed by the light map generators 308, 310, 312. For example, the light map generators 308, 310, 312 may generate one or more light maps based on the one or more images. In some embodiments, the one or more light maps may be generated by combining the first low dynamic range image, the second low dynamic range image, and the third dynamic range image with the different exposure values in order to capture the entire dynamic range of light intensities captured by each of the low dynamic range images. In some embodiments, the one or more light maps include a high dynamic range image representing the lighting of the physical environment with a greater dynamic range of luminosity than the one or more images.

The light map generators 308, 310, 312 may then compress the stream of the one or more images by compressing the one or more light maps to produce one or more compressed light maps. The one or more compressed light maps include an indication of a change in lighting in the one or more images compared to a previously received image. In some embodiments, the one or more light maps may be compressed by generating one or more coefficients representing the indication of the change in the lighting so that the one or more compressed light maps include the one or more coefficients. In some embodiments, the one or more coefficients within the compressed light maps include one or more spherical harmonic coefficients, as described above. In some embodiments, the one or more coefficients include one or more wavelet basis coefficients, as described above.

At block 506, the compressed stream of the one or more images is output for reconstructing the lighting of the physical environment using the compressed stream. In some embodiments, the reconstructed lighting is used to render a computer-generated environment that represents and/or includes at least a portion of the physical environment. In some embodiments, outputting the compressed stream includes outputting the one or more compressed light maps for reconstructing the lighting of the physical environment.

In some embodiments, the process 500 further includes reconstructing the lighting of the physical environment using the compressed stream. In some embodiments, the lighting of the physical environment may be reconstructed using the indication of the change in lighting from the one or more compressed light maps. For example, the global lighting reconstruction engine 314 may use the basis coefficients (spherical harmonic or wavelet) to reconstruct the lighting of the physical environment, as described above.

In some embodiments, the reconstructed lighting of the physical environment is output for rendering the computer-generated environment. In some embodiments, the reconstructed lighting of the physical environment includes a light map representing the reconstructed lighting of the physical environment, and outputting the reconstructed lighting of the physical environment includes outputting the light map representing the reconstructed lighting. In other embodiments, the reconstructed lighting of the physical environment includes one or more reconstruction coefficients representing the reconstructed lighting of the physical environment, and outputting the reconstructed lighting of the physical environment includes outputting one or more reconstruction coefficients representing the reconstructed lighting of the physical environment. The reconstruction coefficients may include the basis coefficients (spherical harmonic or wavelet) discussed above.

In some embodiments, a feedback signal may be generated based on a rendered image. For example, as described above, a post render feedback engine 328 may be used to provide feedback to the image capture engines 302, 304, 306 in order to enhance the quality of the captured lighting information of a physical environment. The live image of the physical environment as captured by a plate camera 322 and a re-rendered image of the physical environment may be compared by the post render feedback engine 328 to determine if a match occurs. The re-rendered image may be generated using a scanned geometry of the physical environment and the reconstructed illumination included in one or more global light maps. If a mismatch between the images is detected, a feedback signal may be output directing one or more of the image capture engines 302, 304, 306 to adjust one or more parameters or settings. The feedback signal may indicate that one or more parameters or settings of light probes (e.g., light probe 402) needs to be adjusted in order to more appropriately capture the lighting of the physical environment.

Figure 6:
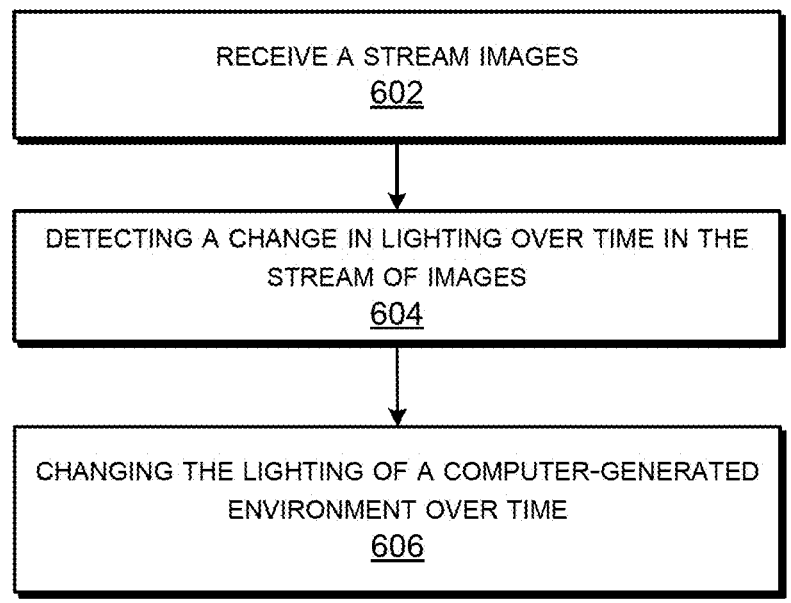
FIG. 6 illustrates an example of a process for changing the lighting of a computer-generated environment based on a stream of images.

FIG. 6 illustrates an example of a process 600 for changing the lighting of a computer-generated environment based on a stream of images. Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 600 may be performed by a computing device, such as the computer system 700 shown in FIG. 7.

Process 600 may begin at block 602 by receiving a stream of images representing lighting of a physical environment. At block 604, the process 600 includes detecting a change in lighting over time in the stream of images. In some embodiments, the change detectors 412, 414, 416 may be used to detect a change in lighting between two or more images within the stream of images. For example, the change detectors 412, 414, 416 may compare data within each received image to data within a previously received image in order to determine whether the data within the images has changed. The change detectors 412, 414, 416 may use various techniques to compare data of two images, as described above. The change detectors 412, 414, 416 may compare two images using a technique that models the human visual system by utilizing a perceptual metric, and/or the change detectors 412, 414, 416 may conduct a pixel-by-pixel comparison in order to determine sufficient changes in the images. For example, corresponding pixels in each image may be compared to one another in order to determine if a sufficient change has occurred in the pixel values. One of ordinary skill in the art will understand that other suitable techniques may be used to detect a change in lighting between images within the stream of images.

At block 606, the process 600 includes changing the lighting of a computer-generated environment over time based on the detected change in lighting in the stream of images. The process 600 may thus dynamically change lighting of the computer-generated environment to reflect the lighting in the physical environment in near real-time or real-time. The process 600 may change the lighting of the computer-generated environment using the techniques described above with respect to FIGS. 3-5. In some embodiments, the process 600 further includes displaying the computer-generated environment with the changed lighting, for example using display 326. The displayed computer-generated environment may be presented in a movie, a game, or any other media presentation.

Referring to FIG. 7, a schematic diagram is shown of an example of a computer system 700. This system is exemplary only and one having skill in the art will recognize that variations and modifications are possible. The system 700 can be used for the operations described in association with the flowchart of FIGS. 5-6, as well as any of the systems shown in FIGS. 1 and 3-4. For example, the computer systems shown in FIG. 7 may be used to implement any of the image capture engines 302, 304, 306, the light map generators 308, 310, 312, the global lighting reconstruction engine 314, the renderer, and/or the post render feedback engine 328.

The system 700 includes a processor 710, a memory 720, a storage device 730, and an input/output interface 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to provide graphical information via input/output interface 740 for display on a user interface of one or more input/output device 750.

The memory 720 stores information within the system 700 and may be associated with various characteristics and implementations. For example, the memory 720 may include various types of computer-readable medium such as volatile memory, a non-volatile memory and other types of memory technology, individually or in combination.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 750 provides input/output operations for the system 700. In one implementation, the input/output device 750 includes a keyboard and/or pointing device. In another implementation, the input/output device 750 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modification may be made without departing from the scope of the invention. Accordingly, other embodiments are within the scope of the following claims.

What is claimed is:

1. A computer-implemented method comprising:
   receiving a stream of one or more images of a physical environment;
   generating one or more light maps based on the one or more images, wherein the one or more light maps include a plurality of light intensity values indicating lighting of the physical environment;
   determining a plurality of coefficients representing the plurality of light intensity values of the one or more light maps;
   generating one or more compressed light maps, the one or more compressed light maps including the plurality of coefficients representing the plurality of light intensity values of the one or more light maps;
   comparing the plurality of coefficients with stored coefficients generated for one or more previous light maps to identify one or more coefficients of the plurality of coefficients that have changed as compared with the stored coefficients of the one or more previous light maps, wherein a number of coefficients in the identified one or more coefficients is less than a number of coefficients in the plurality of coefficients; and
   transmitting, to a rendering device, only the identified one or more coefficients of the plurality of coefficients for reconstructing the lighting of the physical environment, the reconstructed lighting being usable by the rendering device to render a computer-generated environment with the lighting of the physical environment.

2. The method of claim 1, wherein compressing the stream of the one or more images comprises:
   detecting a change in an image of the one or more images compared to one or more previously received images;
   determining whether the detected change is below a threshold level; and
   declining to use the image for reconstructing the lighting of the physical environment in response to determining that the detected change is below the threshold level.

3. The method of claim 1, wherein the lighting of the physical environment is reconstructed using the identified one or more coefficients.

4. The method of claim 3, wherein the reconstructed lighting of the physical environment includes a light map representing the reconstructed lighting of the physical environment.

5. The method of claim 1, wherein the reconstructed lighting of the physical environment includes one or more reconstruction coefficients representing the reconstructed lighting of the physical environment.

6. The method of claim 1, wherein the one or more coefficients include one or more spherical harmonic coefficients.

7. The method of claim 1, wherein a coefficient of the plurality of one or more coefficients includes one or more wavelet basis coefficient coefficients.

8. The method of claim 1, wherein the one or more images include low dynamic range images.

9. The method of claim 8, wherein the one or more images include a first low dynamic range image captured at a first exposure value, a second low dynamic range image captured at a second exposure value different than the first exposure value, and a third dynamic range image captured at a third exposure value different than the first and second exposure values.

10. The method of claim 9, wherein generating the one or more light maps includes combining the first low dynamic range image, the second low dynamic range image, and the third dynamic range image.

11. The method of claim 1, wherein the one or more light maps include a high dynamic range image representing the lighting of the physical environment with a greater dynamic range of luminosity than the one or more images.

12. A computer-implemented method, comprising:
    receiving a stream of one or more images of a physical environment;
    generating one or more light maps based on the one or more images;
    compressing the one or more light maps to produce one or more compressed light maps, the one or more compressed light maps including a plurality of coefficients associated with the one or more light maps;
    comparing the plurality of coefficients with stored coefficients generated for one or more previous light maps to identify one or more coefficients of the plurality of coefficients that have changed as compared with the stored coefficients of the one or more previous light maps, wherein a number of coefficients in the identified one or more coefficients is less than a number of coefficients in the plurality of coefficients; and
    transmitting only the identified one or more coefficients of the plurality of coefficients for reconstructing the lighting of the physical environment.

13. A system, comprising:
a memory storing a plurality of instructions; and
one or more processors to:
receive a stream of one or more images of a physical environment;
generate one or more light maps based on the one or more images, wherein the one or more light maps include a plurality of light intensity values indicating lighting of the physical environment;
determine a plurality of coefficients representing the plurality of light intensity values of the one or more light maps;
generate one or more compressed light maps, the one or more compressed light maps including the plurality of coefficients representing the plurality of light intensity values of the one or more light maps;
compare the plurality of coefficients with stored coefficients generated for one or more previous light maps to identify one or more coefficients of the plurality of coefficients that have changed as compared with the stored coefficients of the one or more previous light maps, wherein a number of coefficients in the identified one or more coefficients is less than a number of coefficients in the plurality of coefficients; and
transmit, to a rendering device, only the identified one or more coefficients of the plurality of coefficient for reconstructing the lighting of the physical environment, the reconstructed lighting being usable by the rendering device to render a computer-generated environment with the lighting of the physical environment.

14. The system of claim 13, wherein compressing the stream of the one or more images comprises:
detecting a change in an image of the one or more images compared to one or more previously received images;
determining whether the detected change is below a threshold level; and
declining to use the image for reconstructing the lighting of the physical environment in response to determining that the detected change is below the threshold level.

15. A computer-readable memory storing a plurality of instructions executable by one or more processors, the plurality of instructions comprising:
instructions that cause the one or more processors to receive a stream of one or more images of a physical environment;
instructions that cause the one or more processors to generate one or more light maps based on the one or more images, wherein the one or more light maps include a plurality of light intensity values indicating lighting of the physical environment;
instructions that cause the one or more processors to determine a plurality of coefficients representing the plurality of light intensity values of the one or more light maps;
instructions that cause the one or more processors to generate one or more compressed light maps including the plurality of coefficients representing the plurality of light intensity values of the one or more light maps;
instructions that cause the one or more processors to compare the plurality of coefficients with stored coefficients generated for one or more previous light maps to identify one or more coefficients of the plurality of coefficients that have changed as compared with the stored coefficients of the one or more previous light maps, wherein a number of coefficients in the identified one or more coefficients is less than a number of coefficients in the plurality of coefficients; and
instructions that cause the one or more processors to transmit, to a rendering device, only the identified one or more coefficients of the plurality of coefficients have changed for reconstructing the lighting of the physical environment, the reconstructed lighting being usable by the rendering device to render a computer-generated environment with the lighting of the physical environment.

16. The computer-readable memory of claim 15, wherein compressing the stream of the one or more images comprises:
detecting a change in an image of the one or more images compared to one or more previously received images;
determining whether the detected change is below a threshold level; and
declining to use the image for reconstructing the lighting of the physical environment in response to determining that the detected change is below the threshold level.

17. The computer-readable memory of claim 15, wherein the one or more images include a first low dynamic range image captured at a first exposure value, a second low dynamic range image captured at a second exposure value different than the first exposure value, and a third dynamic range image captured at a third exposure value different than the first and second exposure values, and wherein generating the one or more light maps includes combining the first low dynamic range image, the second low dynamic range image, and the third dynamic range image.

18. The computer-readable memory of claim 15, wherein the one or more light maps include a high dynamic range image representing the lighting of the physical environment with a greater dynamic range of luminosity than the one or more images.

19. The computer-readable memory of claim 15, wherein the lighting of the physical environment is reconstructed using the identified one or more coefficients.

20. The computer-readable memory of claim 19, wherein the reconstructed lighting of the physical environment includes a light map representing the reconstructed lighting of the physical environment.

21. The computer-readable memory of claim 15, wherein the reconstructed lighting of the physical environment includes one or more reconstruction coefficients representing the reconstructed lighting of the physical environment.

22. The computer-readable memory of claim 15, wherein a coefficient of the plurality of coefficients includes a spherical harmonic coefficient.

23. The computer-readable memory of claim 15, wherein a coefficient of the plurality of coefficients includes a wavelet basis coefficient.

* * * * *

UNITED STATES PATENT AND TRADEMARK OFFICE
CERTIFICATE OF CORRECTION

PATENT NO. : 9,854,176 B2
APPLICATION NO. : 14/164006
DATED : December 26, 2017
INVENTOR(S) : Michael Sanders et al.

It is certified that error appears in the above-identified patent and that said Letters Patent is hereby corrected as shown below:

In the Claims

Column 26, Claim 15, Lines 12-13:
Replace "or more coefficients of the plurality of coefficients have changed for reconstructing the lighting of the physical" with --or more coefficients of the plurality of coefficients for reconstructing the lighting of the physical--

Signed and Sealed this
Nineteenth Day of June, 2018

Andrei Iancu
*Director of the United States Patent and Trademark Office*